Figure 1A:
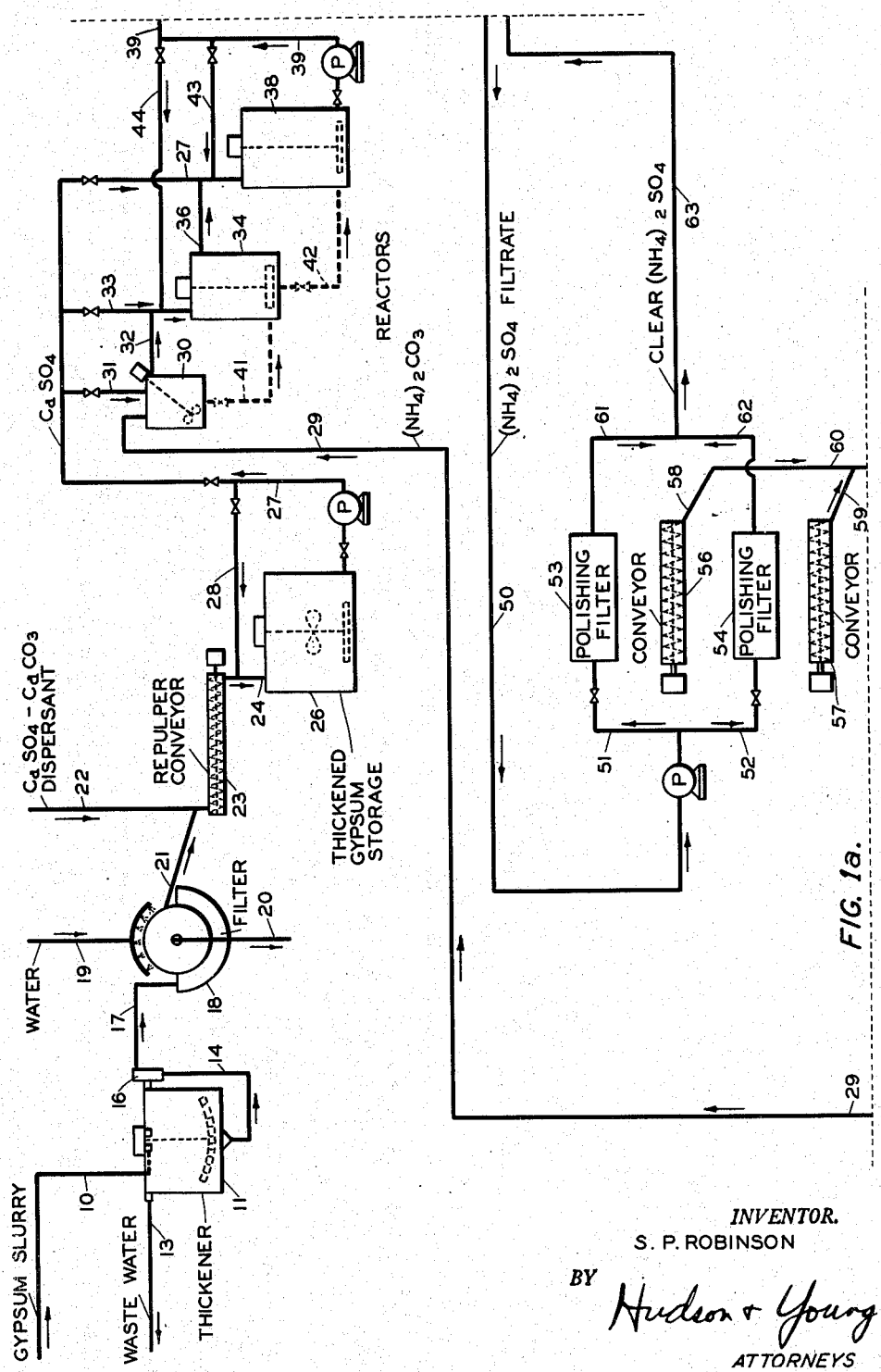

INVENTOR.
S. P. ROBINSON

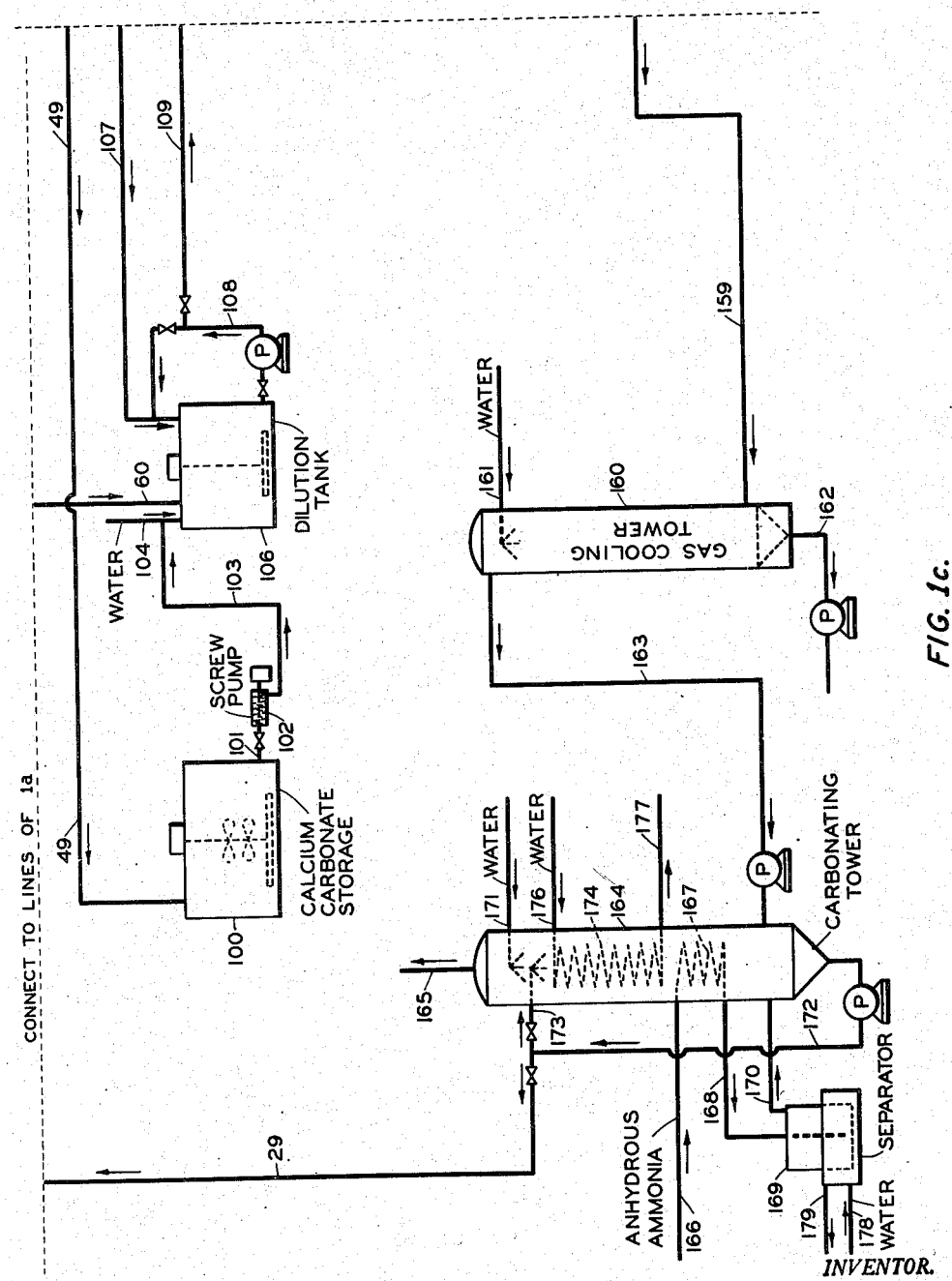

Oct. 20, 1953  S. P. ROBINSON  2,656,247
AMMONIUM SULFATE AND CALCIUM OXIDE MANUFACTURE
Filed Sept. 19, 1949  4 Sheets-Sheet 4

INVENTOR.
S. P. ROBINSON
BY
Hudson & Young
ATTORNEYS

Patented Oct. 20, 1953

2,656,247

UNITED STATES PATENT OFFICE 2,656,247

AMMONIUM SULFATE AND CALCIUM OXIDE MANUFACTURE

Sam P. Robinson, Bartlesville, Okla., assignor to Phillips Petroleum Company, a corporation of Delaware Application September 19, 1949, Serial No. 116,587

9 Claims. (Cl. 23—119)

This invention relates to a process for the production of ammonium sulfate in exceptionally high yields and the production of by-product lime of high purity. In one of its more specific aspects this invention relates to preventing the formation of certain complexes which reduce the yield of ammonium sulfate, and removal of impurities from by-product calcium carbonate to produce high purity calcium oxide.

There are two main processes by which ammonium sulfate is manufactured. The first is by the direct neutralization of ammonia and sulfuric acid, and the second is the reaction of calcium sulfate with ammonium carbonate. It is this latter process, often called the gypsum process or the Merseberg process, with which the present invention is concerned.

The manufacture of ammonium sulfate by the gypsum process comprises reacting calcium sulfate or gypsum with ammonium carbonate. Such reaction produces ammonium sulfate which at the present time is usually considered the main product, and calcium carbonate which may be calcined to calcium oxide and recovered as a by-product. As presently practiced the gypsum process provides for limited conversion of the gypsum to the 94 to 96 weight per cent range and ammonia recovery to less than 97 weight per cent, even when extraordinary precautions are taken to insure satisfactory reaction time and to prevent undue vapor losses.

In addition to the reduced volume of product, the by-product lime is impure because the gypsum used is rarely pure calcium sulfate. Often the calcium carbonate from which the lime is made is contaminated with such materials as calcium phosphate, calcium fluoride, silica, unreacted gypsum, and/or insoluble complexes. It is these materials which lower the purity of the calcium oxide to an undesirably low figure.

So far as is known, by-product lime is not now produced commercially from the gypsum or Merseberg process chiefly because of the large quantities of the above named impurities which limit the available calcium oxide content to about 70 per cent or less. By available lime content I mean the effective neutralizing calcium oxide content of the actual uncombined calcium oxide present.

It is an object of this invention to provide an improved process for the manufacture of ammonium sulfate and calcium oxide.

Another object is to provide a process whereby high yields of ammonium sulfate may be had.

Still another object is to provide a process for the manufacture of lime of greater than 70 per cent available calcium oxide as a by-product of the gypsum process.

Another object is to provide a process for minimizing the formation of undesirable complexes which will contaminate the by-product lime and reduce the yield of ammonium sulfate produced by the gypsum process.

Another object is to provide a process for the removal of impurities from calcium carbonate so as to provide a lime produced therefrom of high calcium oxide availability.

Still other objects and advantages of my invention will be apparent to one skilled in the art from the accompanying disclosure and discussion.

I have found that the yield of ammonium sulfate from a gypsum process is reduced by the formation of insoluble calcium sulfate-calcium carbonate and calcium sulfate-ammonium sulfate complexes which are carried through to the calcium carbonate, thereby also greatly decreasing the purity of the lime made therefrom. I have discovered a process whereby the formation of such complexes may be appreciably reduced and whereby impurities in the gypsum which also carry through to the calcium carbonate may be removed therefrom so as to provide a lime by-product of relatively high purity.

In accordanec with one embodiment of my invention a gypsum slurry is passed to a suitable thickening tank where excess water is removed as a pre-treatment before filtering. In this manner, the capacity of the filter is considerably increased. The thus-produced filter cake is preferably admixed with a calcium sulfate-calcium carbonate dispersal agent such as "Calgon" or "Goulac" and a pH regulator such as soda ash (sodium carbonate) ahead of a repulping conveyor and a thickened gypsum storage tank. The calcium salt dispersant is added to hinder calcium carbonate particle agglomeration in the subsequent reactors. The amount of dispersant can be controlled to effect a compromise between complete dispersion and that necessary to prevent excessive amounts of occluded silica; the silica being an impurity in the gypsum. If complete dispersion was made, the material would be difficult to thicken. When such dispersants are not used, the silica is occluded in the calcium carbonate which makes removal highly expensive and sometimes almost impossible.

Both "Calgon" and "Goulac" are well known materials, the former consisting of sodium hexametaphosphate, and the latter consisting primarily of mixed calcium salts of lignin sulfonic acids.

In my gypsum process, a gypsum slurry containing a calcium salt dispersal agent is passed from suitable storage tanks to multi-stage reaction vessels, preferably a three-stage system. The gypsum is not slurried in weak ammonium sulfate, as is often the practice, because it is relatively soluble in such a solution, and because it will form an ammonium sulfate-calcium sulfate complex. The multi-stage reactors are set up in series and in such a manner that the first is the smallest and is equipped for fastest stirring. Each of the remaining reactors is larger than the preceding and has slower stirring. The slurry is reacted with ammonium carbonate in such a manner that an excess of at least 30 to 50 grams of ammonium carbonate per liter is present over and above that required to react with the total gypsum. Further, it is preferable to maintain the reaction mixture at a pH above 8.5, and preferably in the range of 8.8 to 9.2, and with an $NH_3/CO_2$ ratio sufficient to give such a pH in stage 3. The reaction temperature is maintained below 100° F. and the time during which ammonium sulfate and calcium sulfate are in contact with one another is preferably limited. Excess ammonium carbonate, repulping of gypsum with water instead of dilute ammonium sulfate, and elimination of recycled ammonium sulfate solution effectively prevent excessive small calcium carbonate nuclei formation and the formation of insoluble calcium carbonate-calcium sulfate complex while all solid particles are small.

In the first and second reaction stages, calcium sulfate is added to an excess of ammonium carbonate. This second and larger vessel of the second stage and the lesser degree of agitation therein are more favorable to calcium carbonate crystal growth. An excess of ammonium carbonate in each stage effectively retards the tendency of gypsum to dissolve in the ammonium sulfate solution formed. The last and largest sized reactor completes the reaction of the last of the $CaSO_4$ in the gypsum. By so operating, maximum calcium carbonate crystal growth without agglomeration is promoted.

The three reactors are used in the preferred embodiment of my invention "in cascade" to provide for gravity flow and/or drainage. Sufficient heat required for best reaction is provided for by the reaction itself, care being taken that it does not exceed the upper limit of 100° F.

The reaction product, i. e., aqueous ammonium sulfate and ammonium carbonate and solid calcium carbonate, is immediately filtered and washed with 120° F., preferably alkaline (pH of 9.0), wash water rather than stored to keep the formation of an ammonium sulfate-calcium sulfate complex to a minimum. This will also keep down the tendency of calcium sulfate and calcium bicarbonate to dissolve in the ammonium sulfate solution, and will prevent an excess solution of calcium sulfate in the ammonium sulfate filtrate which would lower the nitrogen content of the ammonium sulfate by mother liquor build-up of calcium sulfate. Storage tanks should not be inserted in the system until complete solid-solution separation has been made. This means that after the first filtration the filtrate must then be passed to polishing filters to remove completely any remaining solid material. Suitable filters of this type are the Sweetland, Adams, Vallez, and Kelly. When this has been accomplished, the ammonium sulfate solution may be stored as desired.

Prior to introducing the ammonium sulfate to concentration and crystallization apparatus, sufficient sulfuric acid is added to convert almost all of the remaining ammonium carbonate and ammonium bicarbonate to ammonium sulfate and carbon dioxide and to bring the pH within a range of 5.0 to 6.0. A small portion of the ammonium carbonate is allowed to remain because its presence helps keep the solubility of calcium sulfate in the ammonium sulfate solution at a minimum. The ammonium bicarbonate present is formed in equilibrium

$$(NH_4)_2CO_3 \rightleftarrows NH_4HCO_3 + NH_3$$

when the ammonium carbonate is heated by the heat of reaction. It may be desirable, under some conditions, as are disclosed in my copending application Serial No. 69,196, filed January 4, 1949, now Patent No. 2,516,420 dated July 25, 1950, to leave a greater portion of the ammonium carbonate or ammonium bicarbonate in the sulfate solution as a crystal growth control material. When excess sulfuric acid is present in the ammonium sulfate, it is neutralized after crystallization by ammoniacal wash water applied on the crystal filters.

The purity of by-product lime from the gypsum process may be further increased by the removal of impurities which are originally in the gypsum from the calcium carbonate by-product. The major impurities which must be dealt with are calcium phosphate $[Ca_3(PO_4)_2]$, calcium fluoride $(CaF_2)$, and silica $(SiO_2)$. Residues of all three of these materials are not susceptible to removal by sulfuric acid treatment as has been discovered in superphosphate and triple superphosphate production. Most of the silica in the gypsum occurs as quartzite although some is tied up with alumina $(Al_2O_3)$ as colloidal clay.

It has been found that purification of the gypsum prior to reaction with ammonium carbonate by such means as hydroseparation, screening, or air separation will not improve the purity of the gypsum to any great extent without appreciable loss of gypsum in the rejects. Froth flotation tests have shown that gypsum forms calcium soaps with the better and cheaper saponified oil flotation agents, thus causing high reagent costs. In addition, purification at this point will remove considerable gypsum from the system before it has had a chance to react with ammonium carbonate.

According to my invention removal of silica is made from the calcium carbonate which has been removed from the ammonium sulfate solution by filtration prior to converting it to lime. This is done by froth flotation. Flotation agents are added to an aqueous slurry containing about 25 per cent by weight of dispersed calcium carbonate in flotation cells where the calcium carbonate is picked up by the froth and thus separated from the silica which remains in the solution. Suitable low cost frothing agents which may be used with advantage are saponified pine oil or tallol. Flocculating and foam breaking materials may then be added to the froth or foam to recover the silica free-calcium carbonate. Flocculating materials such as caustic starch, glue, and dextrin are preferably used to increase particle size and thus reduce the loss of carbonate by subsequent thickening steps in the water separated thereby. Among suitable foam depressants which may be used along with the flocculating agents, are sulfonated castor oil, kerosene, and octyl alcohol.

The by-product calcium carbonate from which silica has been removed is thickened and then further treated to remove calcium phosphate and calcium fluoride. The phosphate is removed by burning the calcium carbonate in the presence of low ash organic matter such as grapefruit rind, molasses from citrus canning industry, precipitated lignin from pulp and paper operations, molasses from beet sugar or cane sugar refining operations, etc., at elevated temperatures such as in the range of 2100 to 2200° F. whereby calcium phosphate is reduced to calcium oxide in the presence of carbon or carbon monoxide. Calcium fluoride may also be removed during calcination by reacting with it equimolar quantities of silica to form $SiF_4$ and thereby produce additional lime. Temperatures which may be used to calcine the calcium carbonate to calcium oxide, and also remove the phosphate and fluoride, will depend somewhat upon the type of equipment used. In all cases care must be taken not to overburn the lime by too long exposure to high temperature. In a fluosolids type kiln, a suitable broad range of temperature is 1550 to 1850° F., while a preferred range is 1700 to 1800° F. In a rotary type of kiln, somewhat higher temperatures may be used such as in the broad range of 1850 to 2450° F., but preferably 2200 to 2400° F. Low ash organic material such as the grapefruit rind, etc., may be used to decompose the impurities with less danger of overburning the product lime.

Figure 1B:
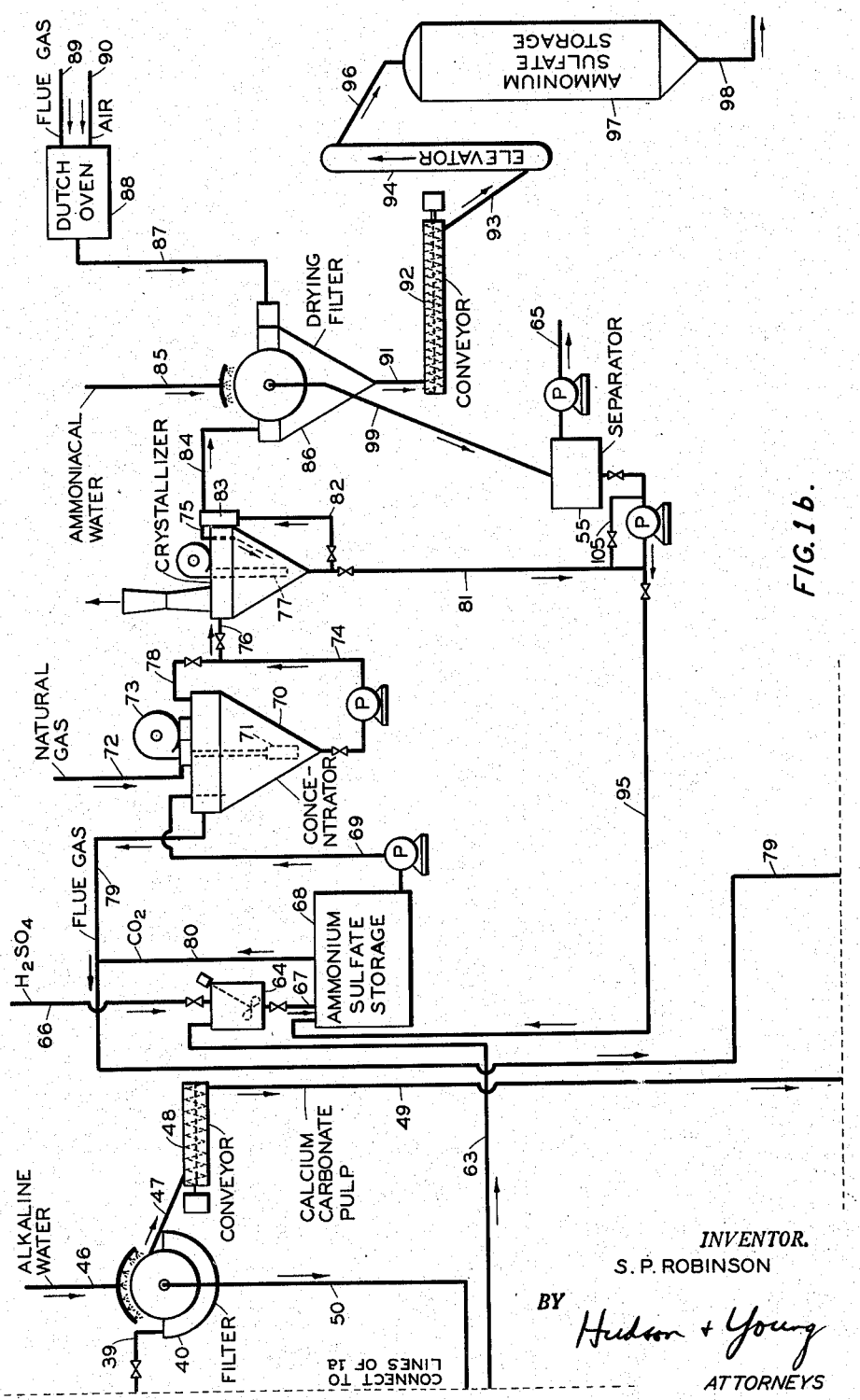
Figure 1D:
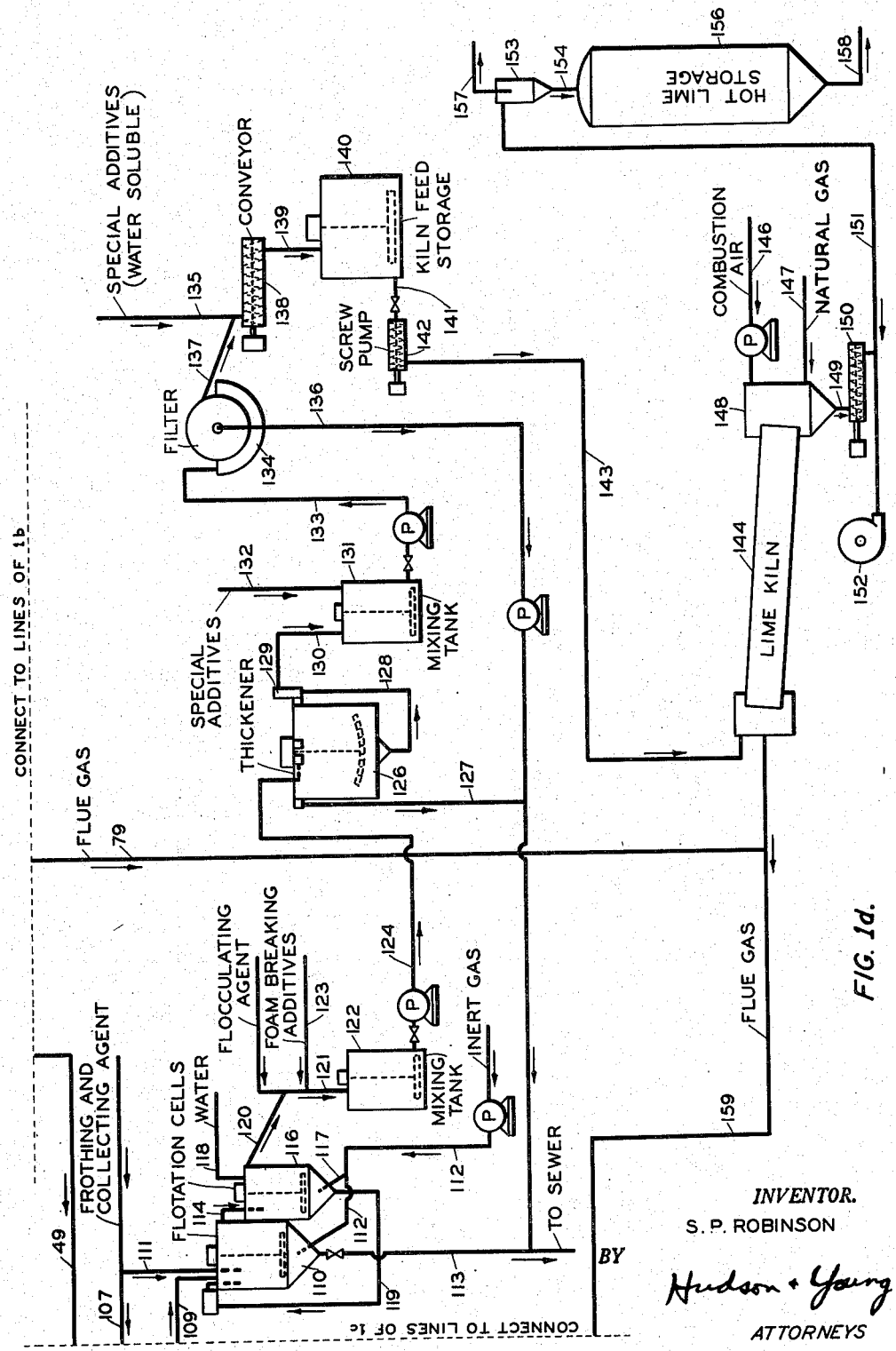

For a further understanding of my invention refer to the attached drawings in conjunction with the following discussion. These drawings represent a complete flow sheet for a gypsum process whereby ammonium sulfate and calcium oxide are produced. To follow the complete flow diagram, place the drawings as follows. Figures 1a and 1b are placed together along the short dotted lines of each, and Figures 1c and 1d are similarly placed. The two groups of figures are now placed together along the long dotted lines so that Figure 1a is opposite Figure 1c, and Figure 1b is opposite 1d. The discussion and flow diagram represent one embodiment of my invention; and it is understood that while this is representative in general of my process, various minor changes may be made in adapting the process to the various conditions within the scope of the invention. Pumps for maintaining the flow of materials throughout the system have been indicated on the drawings, but have not been discussed, inasmuch as their use is well within the skill of the art.

A slurry of by-product gypsum such as may be available from a superphosphate works or calcium sulfate from other sources is introduced via line 10 to thickener 11 which may be a single compartment, torque, tray, traction, or other type of conventional thickener. Waste water removed from the slurry is carried from the launder via line 13. The thickened gypsum slurry is removed from the bottom of thickener 10 via line 14 and is passed to partitioning weir box 16 which may cause a portion of the slurry to be recycled to the thickener when desired. The gypsum should not be slurried in recycle ammonium sulfate even if dilute because there will be formed an insoluble calcium sulfate-ammonium sulfate complex making as much as 3 to 6 volume per cent of the calcium sulfate feed unavailable. Further, the gypsum is relatively soluble in a dilute solution of ammonium sulfate and would therefore be lost during filtering operations.

The thickened gypsum from weir box 16 is passed via line 17 to open rotary filter 18 where it is washed to remove any soluble impurities. Any suitable filter may be used which is adapted for this type of separation, however, I usually prefer to use an open filter because it is somewhat more economical to purchase, although closed filters are equally applicable and in some cases may be the most desirable. Line 19 indicates a conduit through which wash water is passed to the filter. Line 20 indicates a withdrawal conduit for waste water, air, and removed impurities. The gypsum filter cake is passed from the filter via lines 21 and 22 to repulping conveyor 23 where it is again made into a slurry of the proper consistency and wherein a calcium dispersant introduced via line 22 is admixed therewith. The addition of the dispersant hinders agglomeration and binding of the unreacted gypsum. The repulped gypsum is passed via line 24 to thickener and storage unit 26. Gypsum slurry to be used is withdrawn from unit 26 via line 27. Recycle line 28 is supplied so that a constant current may be maintained within the storage unit thus preventing settling of the gypsum.

Ammonium carbonate, prepared as hereinafter discussed, is passed via line 29 to reactor 30, the first of a group of three reactors of increasing size, equipped with an efficient stirring means. Calcium sulfate from line 27 is introduced to reactor 30 where it is reacted with the ammonium carbonate introduced thereto. A sufficient excess of ammonium carbonate is introduced to reactor 30 so that at least a 15 to 25 weight per cent excess is maintained throughout the whole reaction process. The reason for using an excess of ammonium carbonate is to prevent the formation of an insoluble calcium sulfate-calcium carbonate complex which is almost impossible to reconvert. Calcium sulfate from line 27 is introduced to reactor 30 via line 31 in such quantity and at such a rate that the reaction temperature is maintained preferably below 100° F. such as within the range of 85 to 90° F. Product material from zone 30 is removed via line 32 and passed via line 33 along with additional calcium sulfate to reactor 34. Again the reactants are mixed, only more slowly than in reactor 30, until all of the calcium sulfate has been utilized. The use of the multi-stage type reaction zone provides a progressively longer contact time as the ammonium sulfate liquor becomes more concentrated thus insuring complete reaction and maintenance of a reaction temperature within the desired range. The product from reactor 34 is then removed via line 36 and passed along with additional calcium sulfate from line 27 into reactor 38. The reaction product from reactor 38 is removed via line 39 and passed therethrough to filter 40. This filter may be any conventional drum filter equipped with washing apparatus. It may be an open or a closed filter, the former usually being chosen because of its cheapness.

An alternate method for transferring the product from one reactor to another is indicated by dashed lines 41 and 42. This method provides for the removal of the reaction product from the bottom of reactors 30 and 34 and introduction thereof to the bottom of reactors 34 and 38, respectively. Such a procedure as this is in many cases advantageous because it allows more gradual contact of the gypsum with the ammonium carbonate. It also helps remove the calcium carbonate precipitate which will tend to settle to the bottom of the reactors.

Lines 43 and 44 are provided for recycle of a portion of the product removed from reactor 38 back to reactors 34 or 38 when desired. Such recycle may be advantageous to provide a greater flow of materials through these two reactors and thereby maintenance of greater homogeneity of materials therein.

Filter 40 to which alkaline, preferably ammoniacal, wash water is introduced via line 46 separates most of the by-product calcium carbonate which is in an undissolved state from the aqueous solution of ammonium sulfate product. The calcium carbonate filter cake is removed from the filter via line 47 and passed by means of pulping conveyor 48 to line 49 and therefrom to treatment discussed hereinbelow. Ammonium sulfate solution still containing small quantities of calcium carbonate is removed from filter 40 and passed via line 50 and lines 51 and 52 directly to polishing filters 53 and 54 without storage for complete removal of remaining calcium carbonate. This procedure is necessary and a prerequisite of high yields of ammonium sulfate. If the ammonium sulfate solution is stored for a time as it comes from the reactors in the presence of calcium carbonate, the undesirable complexes $(NH_4)_2SO_4$—$CaSO_4$ and $CaSO_4$—$CaCO_3$ are formed as a precipitate which is then removed along with remaining calcium carbonate. The polishing removes the remaining solid components of the ammonium sulfate solution. These solid materials drop onto screw conveyors 56 and 57 and are passed therefrom via lines 58 and 59, respectively, to line 60. The clear solution of ammonium sulfate is removed from the filters via lines 61 and 62 and passed to line 63 through which it is conveyed to reactor 64. Sufficient sulfuric acid is introduced to reactor 64 via line 66 to react with the remaining ammonium carbonate, bicarbonate, and carbamate in the ammonium sulfate solution forming additional ammonium sulfate and carbon dioxide and water. In addition, sufficient acid should be added to reduce the pH of the solution to within about 5.0 to 6.0. The product from reactor 64 is passed via line 67 to ammonium sulfate storage tank 68. Under certain conditions of crystallization as are disclosed in my copending application Serial No. 69,196, filed January 4, 1949, now Patent No. 2,516,420, dated July 25, 1950, it is desirable to leave quantities of ammonium carbonate, bicarbonate or carbamate in the ammonium sulfate solution. When this is done only sufficient acid is introduced to the reactor to reduce the amount of ammonium carbonate or bicarbonate to within the desired range.

Ammonium sulfate solution which is usually fairly dilute is passed from storage tank 68 via line 69 to submerged flame concentrator 70. Natural gas is introduced to the concentrator via line 72 along with the proper quantities of air for combustion introduced via blower 73 and the mixture burned below the liquid level of ammonium sulfate in burner 71 thus causing evaporation of water due to the heat generated. Any submerged flame concentrator such as the Ozark-Mahoning concentrator is satisfactory. The primary use of the evaporator is to raise the boiling point solubility of the ammonium sulfate, preferably within about 25° F. of its limit.

The boiling point solubility limit as referred to above is that point beyond which no more of a material, in this case ammonium sulfate, will dissolve in the solvent without crystallization at the boiling point of the solution at substantially atmospheric pressure.

The concentrated solution is removed from the bottom of flame concentrator 70 via line 74 and is passed via line 76 to evaporative crystallizer 77, which is disclosed in my copending application, Serial No. 69,197, filed January 4, 1949, now Patent No. 2,614,035, dated October 14, 1952. In this type of crystallizer, a stream of air is blown through the liquor thus evaporating the water from the solution and thereby causing the liquor to pass its supersaturation limit and formation of crystals. If desired, a portion of the concentrated solution from concentrator 70 may be recycled through line 78. The flue gas from the flame concentrator is removed via line 79 and is passed along with carbon dioxide removed from ammonium sulfate storage tank 68 via line 80 to ammonia carbonation to be discussed hereinbelow.

The operation of the evaporative crystallizer is fully discussed in the above-mentioned copending application, Serial No. 69,197, now Patent No. 2,614,035, and will therefore be mentioned here only briefly in relation to the flow sheet. Its use is further discussed in detail in my copending application, Serial No. 69,196, filed January 4, 1949, now Patent No. 2,516,420. A slurry or magma of the largest crystals formed within the crystallizer is removed from the bottom thereof via line 81 and is passed therefrom through line 82 to partitioning weir box 83. In partitioning weir box 83 a portion of the slurry is separated and recycled to crystallizer 77 via line 75. Such recycle is advantageous in growing large crystals and in preventing clogging of apparatus by crystal growth. The remaining portion of the slurry is passed via line 84 to the top feed filter with a flue gas dryer 86. Any conventional dryer of this type may be used. This portion of the crystal slurry is separated in filter 86 and the crystals washed with ammoniacal wash water introduced via line 85 to neutralize any traces of acid. The thus separated crystals are dried by contacting hot flue gas introduced to filter 86 via line 87 form Dutch oven 88 where it is generated by burning fuel gas and air introduced thereto via lines 89 and 90, respectively. Other suitable filter and drying means may be used such as a filter like filter 40 used in conjunction with a rotary flue gas dryer. Washed and dried crystals are removed from the filter via line 91 and passed through conveyor 92 and line 93, elevator 94, and line 96 to storage facilities 97. Conveyor 92 may be of any conventional type suited for this type of transfer. One such conveyor is of the rotary screw type as illustrated in the flow sheet although continuous belt conveyors may also be used. When the latter is used, it may be possible to dispense with elevator 94. Product ammonium sulfate crystals are removed from storage unit 97 via line 98.

Ammonium sulfate liquor separated from the crystals in filter 86 is removed therefrom along with the drying gas via line 99 and is passed to separator 55 from which the gas is removed via line 65. The liquid from separator 55 is passed via line 95 to ammonium sulfate storage tank 68. Under some conditions, such as shutting down of equipment, it may be desirable to remove ammonium sulfate and crystals from crystallizer 77, and this may be done by passing them through lines 81 and 105 to line 95 and therefrom into storage tank 68.

Calcium carbonate pulp which is to be burned to by-product lime is passed via line 49 to storage tank 100. This pulp contains many of the gypsum impurities which were present in the process. It is removed from storage tank 100 via line 101 and is fed at a desired flow rate by means of screw pump 102 via lines 103 and 104 to dilution tank 106. Water which is also introduced to tank 106 via line 104 is admixed with the calcium carbonate to form a slurry of proper consistency. Additional carbonate from polishing filters 53 and 54 is introduced to dilution tank 106 via line 60. Frothing and collecting agents are introduced to dilution tank 106 via line 107 and are admixed therein with the calcium carbonate slurry. The slurry to be treated for removal of impurities is removed from tank 106 via line 108 and is passed therefrom via line 109 to flotation cell 110 for removal of silica. A portion of the material removed from tank 106 via line 108 may be recycled via line 107 to provide greater agitation and circulation within the tank to maintain the slurry more homogeneous. Additional frothing and collecting agents, i. e., an additional portion of those passed to the calcium carbonate in the dilution tank, are passed via line 111 to flotation cell 110 known as a rougher cell. Frothing agents which will work very satisfactorily are pine oil, tallol, and other soft and hard wood oils, and mixtures of certain alcohols and ketones sold commercially as frothing agents. Collecting agents which are applicable are xanthates, dithio-phosphates, alpha naphthylamine, thiocarbamates, etc. Most of the commercial frothflotation processes and apparatus such as are shown in the "Chemial Engineers' Handbook," second edition, sixth impression, edited by John H. Perry, Ph. D., are applicable for use in this phase of my invention. For descriptive purposes one method of froth flotation is diagrammatically shown in the float sheet. An inert gas, usually air, is introduced to flotation cell 110 via line 112 and is bubbled through the slurry in the flotation cell. By so doing the particles selectively collected, in this case calcium carbonate, by the collecting agent are carried upward where they contact and are held by the froth until it is removed. The material not collected is silica and is removed from cell 110 via line 113 along with excess water and is passed to a sewer. The froth from cell 110 containing calcium carbonate is removed therefrom via line 114 and is passed to a second flotation cell 116 often called a cleaner cell. Additional water may be introduced to this cell via line 118 if desired. The flotation step is carried out again by bubbling air introduced via lines 112 and 117 through the liquid therein. The liquid phase from cell 116 is passed via line 119 back to cell 114. The froth, containing the calcium carbonate is removed via line 120 and is passed via line 121 to mixing tank 122 where it is mixed with flocculating agents and foam breaking additives introduced thereto via line 121 and line 123, respectively. After flocculation in tank 122, the calcium carbonate is passed to thickener 126 via line 124. The thickener may be of an conventional design adapted for treating materials such as calcium carbonate and as are well known to those skilled in the art. Water is removed from the thickener and passed to sewer via lines 127, 136, and 113. Thickened calcium carbonate slurry is removed from the thickener via line 128 and is passed therethrough to partitioning weir box 129 which may recycle a portion of the slurry to the thickener if desired. The thickened slurry is passed from the weir box via line 130 to another mixing tank 131 where special water insoluble additives, such as finely ground grapefruit rind and fluorspar or fluorite, are introduced via line 132. These additives are introduced to aid in the removal of calcium phosphate, calcium fluoride, and/or residual silica. The water soluble additives such as molasses, etc., should not be added at this point because of the subsequent filtration step. When there is more silica present in the calcium carbonate than calcium fluoride, additional calcium fluoride may be added so that it will react with all of the silica during calcination to form $SiF_4$ which is volatile, and calcium oxide which is recovered as by-product. If there is a predominance of calcium fluoride present, additional silica is added to react with it as above. In either case, stoichiometric quantities of silica and calcium fluoride should be present rather than an excess of either.

The calcium carbonate slurry containing the special water insoluble additives is withdrawn from tank 131 via line 133 and is passed to filter 134. This filter is similar to the other open filters discussed. The design is conventional and is well known to those skilled in the art. Filtrate is removed from filter 134 via line 136 and is discarded, while the filter cake is removed via line 137 and is passed by means of pulping conveyor 138 and line 139 to kiln feed storage tank 140. Special water soluble additives are introduced to the calcium carbonate at the inlet end of pulping conveyor 138 via lines 135 and 137. From storage tank 140 the feed is removed via line 141 and passed by means of screw pump 142 through line 143 to lime kiln 144 where it is contacted with air and a fuel which is burned to supply heat introduced thereto via lines 146 and 147, respectively. The air and fuel, such as natural gas, which are introduced to kiln 144 aid in cooling the kiln product and is in turn preheated for combustion further along the kiln. The calcium carbonate is burned to calcium oxide, the calcium phosphate impurity is burned leaving calcium oxide, and the silica and calcium fluoride are reacted to remove the silicon and fluorine as silicon tetrafluoride and leave calcium oxide. Suitable temperatures for this calcining step are in the range of 1550 to 2400° F. depending on the type of kiln and the additives used. By-product calcium oxide or lime is recovered in hopper 148 and is passed therefrom via line 149 to screw conveyor 150 which passes same to line 151. Blower 152 is attached to line 151 for blowing the by-product lime to storage means. The lime passes to separator 153 from which it drops via line 154 to storage bin 156. Air used to carry the lime through line 151 is exhausted from separator 153 via line 157. Lime is removed from storage by such means as line 158.

Flue gas from lime kiln 144, containing the carbon dioxide recovered by decomposition of $CaCO_3$, is removed therefrom via line 159 and is passed therethrough along with flue gas from submerged flame concentrator 70 and $CO_2$ from tank 68 to cooling tower 160 where it is washed and cooled by water introduced via line 161. Water and sludge are removed from tower 160 via line 162. Cooled and cleaned gases are removed via line 163 and are passed therethrough to carbonation tower 164 where ammonium carbonate, which is to be reacted with the gypsum in the first phase of my process, is prepared. The carbon dioxide in the flue gas is reacted with ammonia gas and water to provide ammonium carbonate, $(NH_4)_2CO_3$. Anhydrous ammonia is passed through line 166 to coil 167 where it is warmed and vaporized. It is withdrawn therefrom via line 168 and passed to a hot-water jacketed separator 169 wherein the gaseous ammonia is separated from the liquid and wherein the liquid is vaporized. Hot water is introduced to the jacket of separator 169 via line 178 and removed therefrom via line 179. The vaporous ammonia is introduced to the lower portion of carbonation tower 164 via line 170 and is reacted therein with carbon dioxide and water to form ammonium carbonate. The water for the reaction is introduced to the tower via line 171. An aqueous solution of ammonium carbonate is recovered from the bottom of the carbonating tower via line 172. A portion of this aqueous product may be passed via line 173 back into the tower and cooled by contacting cooling coils 174. Cooling water is introduced to the coils via line 176 and removed therefrom via line 177. Another portion of the aqueous ammonium carbonate is passed via line 29 to reactor 30 as hereinabove described. Unreacted flue gas is withdrawn from carbonation tower 164 via line 165 and is passed to vent or used as desired.

Advantages of my invention as disclosed are the production of exceptionally high purity ammonium sulfate product and a by-product calcium oxide with an available calcium oxide content above 70 per cent by weight.

Although this process has been described in terms of its preferred modifications, it is understood that various changes may be made without departing from the spirit and scope of the disclosure and of the claims.

I claim:

1. A process for the manufacture of ammonium sulfate in exceptionally high yield which comprises thickening an aqueous slurry of calcium sulfate, filtering said slurry and washing the filter cake obtained therefrom with water at a temperature of at least 120° F. to remove water soluble impurities, admixing with the filter cake a calcium sulfate-calcium carbonate dispersant and repulping the thus-formed admixture, thickening the repulped calcium sulfate which is in the form of a slurry, reacting said calcium sulfate with a quantity of ammonium carbonate such that it remains in at least a 15 to 25 weight per cent excess throughout the reaction at a temperature below 100° F., filtering the product of this reaction in such a manner as to completely remove all of the solid material from the aqueous liquor, neutralizing said aqueous liquor containing ammonium sulfate with sulfuric acid and thereby producing additional ammonium sulfate by reaction with the excess ammonium carbonate, bicarbonate, and carbamate therein, and storing thus-produced ammonium sulfate liquor for further treatment only after all of the solids content has been removed therefrom.

2. A process according to claim 1 in which the reaction between the calcium sulfate and ammonium carbonate is carried out multi-stage; each stage being of increasing size and decreasing mixing.

3. A process according to claim 2 wherein the multi-stage reaction is carried out in three stages.

4. A process for the manufacture of ammonium sulfate in exceptionally high yield which comprises thickening an aqueous slurry of gypsum, filtering said slurry and washing the filter cake obtained therefrom with water at a temperature of at least 120° F. to remove water soluble impurities, admixing with the filter cake a calcium sulfate-calcium carbonate dispersant and repulping the thus-formed admixture, thickening the repulped gypsum which is in the form of a slurry and passing same to a three-stage reaction zone wherein each stage is of increasing size and decreasing agitation, introducing ammonium carbonate to the first stage of said reaction zone in such quantity that it remains in at least a 15 to 25 weight per cent excess throughout the multi-stage reaction, introducing said gypsum slurry to each of the reaction stages, reacting said gypsum and said ammonium carbonate at a temperature below 100° F. and substantially atmospheric pressure, filtering the product of this reaction in such a manner as to completely remove all of the solid material from the aqueous liquor, neutralizing said aqueous liquor containing ammonium sulfate with sulfuric acid and thereby producing additional ammonium sulfate by reaction with the excess amonium carbonate, bicarbonate, and carbamate therein, storing thus-produced ammonium sulfate liquor for further treatment only after all of the solids content has been removed therefrom, withdrawing ammonium sulfate liquor from said storage and passing same to an evaporation zone and then to a crystallization zone, burning natural gas and oxygen in a burner submerged below the liquid level of ammonium sulfate liquor within said evaporation zone and thereby causing water to be removed and the liquor to become supersaturated, passing said supersaturated liquor to said crystallization zone, flowing air through said supersaturated liquor at a sufficient rate to cause evaporation of water and formation of ammonium sulfate crystals, filtering a crystal magma removed from said crystallization zone and thereby separating crystals from the mother liquor, washing said crystals with ammoniacal wash water at a temperature of at least 120° F., drying thus-treated crystals by contacting same with hot combustion gas, and recovering dried ammonium sulfate crystals from said drying as a product of the process; recovering flue gas from said evaporation zone and passing same to a carbonation zone, cooling said flue gas and contacting same with ammonia in the presence of water in such a manner that said ammonia reacts with the carbon dioxide in said gas thereby forming ammonium carbonate, and passing said ammonium carbonate to said three-stage reaction zone as hereinbefore recited.

5. A process according to claim 4 wherein all of the ammonium carbonate is introduced to the first stage of the reaction.

6. A process for the manufacture of ammonium sulfate in exceptionally high yield and calcium oxide with an available lime content above 70 weight per cent by the reaction of calcium sulfate with ammonium carbonate, which comprises passing a carbon dioxide-containing gas to a carbonation zone wherein said gas is cooled and contacted with ammonia in such a manner that said ammonia reacts with the carbon dioxide in said gas thereby forming ammonium carbonate, reacting calcium sulfate and thus-prepared ammonium carbonate in an aqueous medium in a multi-stage reaction zone wherein each stage is of increasing size and decreasing agitation, introducing the ammonium carbonate to the first stage of said reaction zone in such quantity that it remains in excess throughout the reaction, separating the reaction product in such a manner that all of the solid material is removed from the aqueous ammonium sulfate liquor, storing thus-produced ammonium sulfate liquor only after all of the solids content has been removed, separating calcium carbonate recovered from said ammonium sulfate liquor from silica impurity by means of froth flotation, admixing with thus-treated calcium carbonate low ash carbonaceous material, burning said admixture at an elevated temperature and thereby calcining said calcium carbonate to calcium oxide and removing phosphate impurity, and recovering calcium oxide with an available lime content above 70 weight per cent as a product of the process.

7. A process for the manufacture of ammonium sulfate in exceptionally high yield and calcium oxide with an available lime content above 70 weight per cent by the reaction of gypsum with ammonium carbonate, which comprises reacting gypsum in the form of a thickened slurry to which has been added a calcium sulfate-calcium carbonate dispersant in a multi-stage reaction zone wherein each stage is of increasing size and decreasing agitation, introducing all of the ammonium carbonate to the first stage of said reaction zone in such quantity that it remains in at least a 15 to 25 weight per cent excess throughout the multistage reaction, filtering the product of this reaction in such a manner as to completely remove all of the solid material from the aqueous liquor, neutralizing said aqueous liquor containing ammonium sulfate with sulfuric acid and thereby producing additional ammonium sulfate by reaction with the excess ammonium carbonate therein, storing thus-produced ammonium sulfate liquor for further treatment only after all the solids content has been removed therefrom, withdrawing ammonium sulfate liquor from said storage and evaporating same and causing crystallization of the ammonium sulfate therein, and recovering a crystalline ammonium sulfate as a product of the process; passing flue gas from said ammonium sulfate liquor evaporation to a carbonation zone, cooling said gas and contacting same with ammonia in such a manner that said ammonia reacts with the carbon dioxide in said flue gas and thereby forms ammonium carbonate, passing said ammonium carbonate to said multistage reaction zone as hereinbefore recited; separating calcium carbonate separated from said ammonium sulfate liquor from silica impurity by froth flotation, thickening calcium carbonate slurry recovered from said froth flotation and admixing therewith low ash carbonaceous material and sufficient fluorite to react with any remaining silica impurity, burning said calcium carbonate mixture at a temperature in the range of 1550 to 2450° F. thereby forming calcium oxide and removing phosphate and residual silica impurities, and recovering calcium oxide with an available lime content above 70 weight per cent as a product of the process.

8. A process for the manufacture of ammonium sulfate in exceptionally high yield and calcium oxide with an available lime content above 70 weight per cent by the reaction of gypsum with ammonium carbonate, which comprises thickening an aqueous slurry of gypsum, filtering said slurry and washing the filter cake obtained therefrom with water at a temperature of at least 120° F. to remove water soluble impurities, admixing with the filter cake a calcium sulfate-calcium carbonate dispersant and repulping the thus-formed admixture, thickening the repulped gypsum which is in the form of a slurry and passing same to a three-stage reaction zone wherein each stage is of increasing size and decreasing agitation, introducing all of the ammonium carbonate to the first stage of said reaction zone in such quantity that it remains in at least a 15 to 25 weight per cent excess throughout the multi-stage reaction, introducing said gypsum slurry to each of the reaction stages, reacting said gypsum and said ammonium carbonate at a temperature below 100° F. and substantially atmospheric pressure, filtering the product of this reaction in such a manner as to completely remove all of the solid material from the aqueous liquor, washing the filter cake thus-obtained with alkaline wash water at a temperatre of at least 120° F. and a pH of at least 9.0, neutralizing said aqueous liquor containing ammonium sulfate with sulfuric acid and thereby producing additional ammonium sulfate by reaction with excess ammonium carbonate, bicarbonate, and carbamate therein, storing thus-produced ammonium sulfate liquor for further treatment to form crystals therefrom only after all the solids content has been removed therefrom, withdrawing from said storage ammonium sulfate liquor and passing same to an evaporation zone and then to a crystallization zone, burning a fuel and air in a burner submerged below the liquid level of ammonium sulfate liquor within the evaporation zone and thereby causing water to be removed and the liquor to become supersaturated, passing said supersaturated liquor to said crystallization zone, flowing air through said supersaturated liquor at a sufficent rate to cause evaporation of water and formation of ammonium sulfate crystals, filtering a crystal magma removed from the crystallization zone and thereby separating crystals from the mother liquor, washing said crystals with ammoniacal wash water at a temperature of at least 120° F., drying thus-treated crystals by contacting same with hot combustion gas, and recovering dried ammonium sulfate crystals from said drying as a product of the process; recovering flue gas from said evaporation zone and passing same along with additional flue gas to a carbonation zone, cooling said flue gas and contacting same with ammonia in such a maner that said ammonia reacts with the carbon dioxide in said gas thereby forming ammonium carbonate, passing said ammonium carbonate to said three-stage reaction zone as hereinbefore recited; admixing calcium carbonate separated from said ammonium sulfate liquor with water and frothing and collecting agents, froth floating this admixture and thereby removing the calcium carbonate from silica impurity, introducing to the froth from said flotation flocculating and foam breaking additives and thereby breaking down said froth and agglomerating the calcium carbonate therefrom, thickening thus-formed calcium carbonate slurry and introducing thereto and admixing therewith low ash carbonaceous material and fluorite, passing the calcium carbonate admixture to a lime kiln, contacting said calcium carbonate therein with oxygen-containing combustion gases at a temperature in the range of 1700 to 2400° F. and thereby calcining same to calcium oxide and removing phosphate and residual silica impurities, and recovering calcium oxide with an available lime content above 70 weight per cent as a product of the process.

9. A process according to claim 8 wherein said low ash carbonaceous material is finely ground grapefruit rind.

SAM P. ROBINSON.

References Cited in the file of this patent

UNITED STATES PATENTS

| Number | Name | Date |
|---|---|---|
| 1,152,244 | Vis | Aug. 31, 1915 |
| 1,152,245 | Vis | Aug. 31, 1915 |
| 1,835,271 | Burke et al. | Dec. 8, 1931 |
| 1,902,649 | Larsson | Mar. 21, 1933 |

FOREIGN PATENTS

| Number | Country | Date |
|---|---|---|
| 355,098 | Great Britain | Aug. 20, 1931 |

OTHER REFERENCES

Perry Chem. Eng. Handbook, 3rd ed., McGraw-Hill, New York, N. Y., (1950), pages 1050–1061.